United States Patent [19]

Plumat et al.

[11] 3,967,040

[45] June 29, 1976

[54] PRODUCTION OF COLORED GLASS BODIES

[75] Inventors: Émile Plumat, Gilly; Jean Schottey, Montignies-sur-Sambre; Francois Toussaint, Montignies le Tillul, all of Belgium

[73] Assignee: Glaverbel-Mecaniver, Watermael-Boitsfort, Belgium

[22] Filed: Dec. 18, 1974

[21] Appl. No.: 534,137

Related U.S. Application Data

[63] Continuation of Ser. No. 293,033, Sept. 28, 1972, abandoned.

[30] Foreign Application Priority Data

Oct. 1, 1971 Luxembourg.............................. 63992

[52] U.S. Cl. ................................ 428/410; 65/30 E; 65/32; 428/437; 428/441
[51] Int. Cl.² .......................................... C03C 21/00
[58] Field of Search............ 65/114, 30 E, 32, 99 A; 428/441, 410, 437

[56] References Cited

UNITED STATES PATENTS

| | | | |
|---|---|---|---|
| 3,420,698 | 1/1969 | Smith.................................. | 65/30 X |
| 3,495,963 | 2/1970 | Buckley et al.......................... | 65/30 |
| 3,505,160 | 4/1970 | Michaels et al................. | 428/441 X |
| 3,524,739 | 8/1970 | Loukes et al. ....................... | 65/30 X |

*Primary Examiner*—Robert L. Lindsay, Jr.
*Attorney, Agent, or Firm*—Spencer & Kaye

[57] ABSTRACT

Glass bodies formed from a vitrifiable composition are given a desired coloration by introducing a reducing agent into surface layers of the body, during or after its formation from a molten composition, and the then the body surface into contact with a diffusion medium composed of a mixture of a salt furnishing reducible metal ions which are capable of being reduced by the reducing agent, and a diluting agent constituted by a salt of another metal, the body being subjected to temperature conditions such as to cause the reducible metal ions to diffuse into the body surface layers and to there be chemically reduced by the reducing agent.

18 Claims, No Drawings

3,967,040

PRODUCTION OF COLORED GLASS BODIES

CROSS REFERENCE TO RELATED APPLICATIONS

This application is a continuation of our co-pending application Ser. No. 293,033, filed Sept. 28, 1972 now abandoned.

BACKGROUND OF THE INVENTION

The present invention relates to a process for the formation of a glass body from a vitrifiable composition, and particularly to the coloring or modification of the color of such a body by diffusion of a substance into the surface layers of the body from a contacting medium.

It is known to fabricate bodies of colored, or tinted, glass by forming them from a vitrifiable composition into which appropriate coloring, or tinting, agents have been incorporated. However, such a process can be performed in only a limited number of cases, due to the necessity of utilizing a different starting composition for each color to be produced. In the glass industry, particularly in the fabrication of flat glass, it is normally much more practical to color, or tint, the glass bodies during or after their formation so that the coloring treatment can be controlled independently of the composition of the vitrifiable mixture and of the process for producing the glass.

Various methods for coloring a body of glass during or after its fabrication are known. Such methods include covering the glass body with a film of metal or metal oxide, by vapor deposition.

It is possible to produce, by such a method, a very thin film which only slightly reduces the light transmission of the body. However, such a film is subject to deterioration or removal by abrasion or by some mechanical or chemical action.

A more satisfactory known process consists in causing coloring substances to diffuse into the glass at an elevated temperature. By this procedure, it is possible to tint the glass to a certain depth from its surface and the resulting tinting cannot be removed by simple scratching of the glass surface. However, such diffusion processes offer only limited application possibilities if it is desired to color a series of different glasses.

When the known processes are performed, it often proves difficult to achieve a predetermined color density. The color density is a function of factors which cannot be varied entirely at will according to the desired color density, given that their value is critical for other reasons. This is particularly the case when the coloring treatment is carried out in apparatus in which the tempering of the glass is also effectuated.

The coloring elements which prove particularly valuable for various purposes are the elements of Group IB of Mendeleef's Periodic Table. The coloring achieved by means of these elements presents particular problems, given that the ions which diffuse into the glass must undergo a chemical reduction in order to impart a coloration to the glass.

It is advantageous to be able to perform a process in which silver, gold and copper can be utilized to color a body of ordinary soda lime glass and which can be easily controlled, in order to obtain different color densities. Silver, in particular, proves to be a desirable possible coloring agent. This agent is capable of giving glass a yellow color, or tint, which provides protection against actinic radiation.

SUMMARY OF THE INVENTION

It is an object of the present invention to improve the fabrication of colored glass bodies.

Another object of the invention is to improve the fabrication of colored bodies of soda lime glass.

A further object of the invention is to facilitate the coloring of such bodies.

A more specific object of the invention is to permit the formation and the coloring of any body of ordinary soda lime glass by means of a process for coloring by diffusion, utilizing silver, gold or copper as the coloring substance, which process can be easily controlled to obtain various color densities.

The objects of the present invention are achieved in a process for forming a body of glass from a vitrifiable composition and for coloring or modifying the color of such a body by diffusion of a substance into the surface layers of the glass from a contacting medium. According to the present invention, there is introduced into the surface of the body, during or after formation of the body, a reducing agent and the body is then placed into contact with a medium composed of a mixture of at least one salt, furnishing reducible metal ions capable of being reduced by the reducing agent, the mixture also including a diluting agent constituted by one or several salts of another metal or metals, under temperature conditions such that the reducible metal ions diffuse into the body and at least one part of these ions is reduced by the reducing agent.

DESCRIPTION OF THE PREFERRED EMBODIMENTS

The present invention permits the achievement of colorations which it is impossible to obtain with the known diffusion coloring processes. This is due to the combination, on the one hand, of the introduction of a reducing agent into the glass body during the fabrication of the body from a vitrifiable composition and, on the other hand, to the diffusion of reducible ions into the body from a composite treatment medium in which the component or components furnishing the reducible ions are mixed with a diluting agent. The beneficial results obtained by the dilution of the concentration of such components are surprising.

Heretofore, it has been considered to be indispensable to effect the diffusion from a medium constituted entirely by the active component furnishing the ions of the coloring element in order to be able to obtain the desired coloration. According to the process of the present invention, the glass is firstly enriched in the reducing agent and it becomes possible to achieve any desired coloration despite the presence of a diluting agent in the treatment medium which is subsequently utilized.

In addition, it is possible to give the concentration of the diluting agent in such a treatment medium any desired value within a very large range and this provides a new parameter which permits the process to be controlled in a manner to obtain a range of different color densities.

The process according to the invention also provides the substantial advantage of permitting an economy in the consumption of the coloring metal, which permits the process according to the invention to be carried out quite economically on an industrial scale.

The introduction of a reducing agent into the glass body during or after its formation advantageously permits such an agent to be concentrated in the surface layers, of the glass, in which the coloring is to be produced. The coloring agent is thus not distributed uniformly through the body, as are the ingredients of the composition from which the glass body is formed. The reducing agent can, for example, be composed of ions of a single element or of ions of more than one element. It is possible, for example, to introduce reducing ions into the glass by causing them to diffuse into the surface of the body from a contacting medium.

In the most significant applications of the invention, the glass body is constituted by soda lime glass of ordinary composition. Such glasses are substantially colorless and the practice of the present invention permits such glasses to be given colors which are determined uniquely by the coloration process.

The invention proves very useful for forming colored glass bodies starting from soda lime glass placed in a flat shape. The problem of coloring glass bodies in a predetermined and perfectly controlled manner, to satisfy determined optical specifications, arises often during the fabrication of articles formed from, or starting from, soda lime glass having a flat shape. This is true, for example, in the fabrication of flat or curved glazings or lenses for sunglasses. The invention can, for example, be utilized successfully for coloring flat soda lime glass formed by drawing, for example by drawing molten glass in the form of a continuous ribbon through a drawing chamber and a contiguous vertical annealing lehr, as occurs in the standard Pittsburgh type drawing process, or by drawing the ribbon through a drawing chamber and a contiguous horizontal annealing lehr as in the standard Libbey-Owens type drawing process. When drawn glass is being treated, the reducing agent can, for example, be introduced into the glass during the drawing, for example in the drawing chamber.

According to the most important embodiments of the invention, the reducing agent diffuses into the glass body from a mass of higher density material on which the body is formed or treated. By thus combining the first stage of the process with the formation of the glass or another treatment, it is possible to produce a body having the desired final properties in an advantageously short time.

By effectuating the spreading out of molten glass in the form of a layer floating on a mass of higher density material, it is possible to fabricate flat glass of high surface quality. In particular, the face of the flat glass which is formed in contact with the material on which the glass floats is of very high quality. It is particularly advantageous to form such a glass, also known as "float glass", on a higher density material which furnishes the reducing ions which diffuse into the glass. In this case, a high concentration of such reducing ions is achieved in the flat glass which is formed, in particular the surface layers of the rear face of the flat glass, i.e. that face which had been placed in contact with the higher density material.

A certain quantity of reducing ions can also diffuse into the surface layers of the front, or top, face of the flat glass. The diffusion of such reducing ions into the glass does not in any manner adversely affect the optical and surface qualities of this glass.

It is highly desirable to perform in this manner the first step of the process according to the invention at the time of formation of the float glass since after the formation, upon the higher density material, of a glass layer having the required thickness, it is only necessary to simply subject the glass to the second step of the coloring process. This second step involves placing the glass in contact with the second step treatment medium composed of the mixture of metallic salts under such temperature conditions as to provoke the diffusion of the reducible ions into the body and the reduction of at least one part of these ions by the reducing ions.

The second step of the process can be carried out in the float tank in which the flat glass is formed. For example, in a process in which a sufficient quantity of reducing ions is introduced into the upper face of the glass, these ions coming from the higher density material on which the glass floats, it is possible to introduce the mixture of metallic salts constituting the treatment into the atmosphere above the glass floating on the higher density material.

Alternatively, the second step of the coloring process can be carried out on the float glass after it has left the float tank. For example, this second step of the process can be performed at a treatment station through which the glass passes immediately after leaving the float tank. Such station can be situated, for example, between the float tank and the standard annealing lehr or even within the annealing lehr itself.

However, when the second step of the coloring process according to the invention is carried out during the fabrication of the float glass, it is necessary to take into account the controlling conditions of the fabrication process, in particular with regard to the speed of travel of the glass ribbon, which limits the time available for effectuating the coloring.

According to another modification of the process, the second step thereof can be carried out subsequently, after the cooling of the float glass. In this latter case, a supplementary consumption of heat is required for returning the glass to an appropriate temperature. However, this alternative can prove desirable in certain cases since it offers compensating advantages.

It is well known to treat flat glass which has already been formed by causing it to float on a mass of higher density material. When floating flat glass is treated in this manner, very high temperatures can be employed without risk of deteriorating the glass surface due to contact thereof by its support. Treatments can be carried out on the floating flat glass in this manner, these treatments including, for example, resurfacing treatments, i.e. treatments in which the glass is heated sufficiently, while it is in contact with the liquid support medium, to improve the flatness of its surface. The introduction of a reducing agent into flat glass which has already been formed as the present invention provides, can be effectuated from a higher density liquid support medium in the same manner as during the formation of float glass on such a medium. The diffusion of reducible metallic ions into the glass body, from a mixture of metallic salts, according to the invention, can similarly take place in the treatment tank containing such a higher density liquid medium, or even subsequently.

In all processes according to the invention, the reducing agent which is introduced into the surface layers of the glass body during the first step of the process, and which is capable of reducing the reducible metallic ions, preferably includes tin ions. Reducing ions of tin ($Sn^{2+}$) possess a particularly high reducing power.

In certain processes according to the invention, the reducing agent which diffuses into the surface of the glass body is composed of tin ions which diffuse into the body from a mass of molten tin. It is thus easy to effectuate the diffusion of tin ions into the glass body by bringing that body into contact with the molten tin, and the diffusion can take place substantially in a uniform manner into every part of the body surface where it is required.

Molten tin constitutes a particularly desirable higher density liquid medium for floating the molten glass during its formation or for floating flat glass during the performance of a treatment as described above. However, use can be made of other materials for floating the glass, for example molten lead. Lead ions can equally be utilized for reducing the reducible ions of the coloring metals.

The present invention includes processes of the type described above in which the agent introduced into the glass body surface, for the purpose of reducing the subsequently introduced reducible ions, is composed of ions of at least one of the elements selected from the group consisting of: Pb, Cu, As, Sb, Bi, S, Ce, Fe, Se, V, Cr, Mn, Mo and W.

Preferably, the concentration of the reducing agent in at least one part of the surface of the glass body is at least 1% by weight prior to the diffusion of reducible metallic ions into such part of the surface. Such a concentration of the reducing agent, while being far higher than the concentration of reducing agent normally present in ordinary soda lime glass which has undergone any chemical modification, for example in soda lime glass drawn in the form of a ribbon, can be easily obtained during the first step of a coloring process according to the invention and when the concentration of reducing agent present in the surface layers of the glass has reached at least this value, it becomes very easy to achieve substantial color densities during the subsequent step of the process. This is the case even when silver is used as the coloring agent and even when the treatment time and the treatment temperature are maintained within limits which are entirely compatible with competitive industrial processes.

According to preferred embodiments of the invention, the treatment medium is constituted, except for the diluting agent, entirely or in its major part by one or several compounds of silver having a concentration of less than 10% by weight. Silver is a particularly desirable coloring substance. By means of silver, it is possible to impart to the glass a yellow coloration and, if the color is of sufficient density, the colored glass can be utilized as a screen for actinic light. A substantial advantage of the invention is that it permits the attainment of yellow colorations capable of giving the glass a substantial actinic light absorption power, while using a treatment medium containing less than 10% by weight of one or several silver compounds. As a result of such a concentration level, such treatment medium is much less costly than treatment media containing silver and constituted entirely by silver compounds, treatment media of this type having heretofore been considered to be indispensable for producing such a degree of coloration.

In fact, the present invention permits the attainment of such results with treatment media containing much less than 10% by weight of the silver compound. Thus, according to particularly advantageous embodiments of the invention, the concentration of such silver compound or compounds in the treatment medium is less than 3% by weight.

In optimized processes according to the invention, the reducing agent includes tin ions which are introduced into the glass body to attain a concentration of at least 1%, by weight, in at least one part of the surface of the body and the treatment medium is constituted, with the exception of the diluting agent, entirely or in its major part by one or several compounds having a concentration of less than 100 parts per million, by weight. As a result of this combination of conditions, there results a process which can be carried out at very low cost and which nevertheless permits bodies of ordinary soda lime glass to be given a degree of yellow coloration which enables them to be utilized in the field of protection against actinic light.

According to certain embodiments of the invention, the medium utilized during the second step of the process is constituted, with the exception of the diluting agent, entirely or in its major part by one or several compounds of copper having a concentration not exceeding 50% by weight. The utilization of copper is advantageous for obtaining pronounced coloration of the glass body. The resulting coloration is useful, for example, for obtaining decorative effects.

Preferably, the treatment medium is constituted by a salt medium in the molten state, for example by a mixture of molten metallic salts. The utilization of a molten medium is advantageous for promoting a satisfactory diffusion of the reducible metallic ions into the glass body under normal atmospheric pressure. The invention can also be carried out, however, by means of a treatment medium composed of the mixture of metallic salts in a vaporized state.

The molten medium can be sprinkled or sprayed onto the body. However, it is preferred to immerse the body in the molten medium. Immersion is preferred because it generally permits the surface being treated to be maintained more easily at a uniform temperature.

Furthermore, the immersion technique is particularly preferred when the entire surface of the body is to be colored or subjected to a color modification. However, the invention is obviously not limited to processes in which the entire surface of the body is colored or subjected to a color modification. The invention also includes processes in which only a part of the body surface is colored, for example one face of a body having the form of a flat or curved sheet. If it is desired to color, or modify the color of, only one part of a surface, the body can be immersed in the treatment medium after the remainder of the surface of the body has been masked, for example with a temporary layer or coating.

In a modified embodiment of the process, only the part of the body which is to be treated can be immersed, provided that the form of the body permits. As another modification of the process according to the invention, the medium can be maintained in contact with the part of the surface to be treated by restricting such medium with a closed wall which contacts the body along the boundary of that portion of the surface which is to be treated. According to another modification, the medium can be caused to flow along the surface to be colored. The flow technique can also be utilized when it is desired to color, or modify the color of, the entire surface of the body.

When it is desired to color, or modify the color of, only part of the body, it is possible to limit not only the second step of the treatment to this part of the body, but also the first step of the treatment during which the reducing agent is introduced into the body.

When the second step of the process is carried out by bringing a certain quantity of the treatment medium, in a molten state, into contact with the body to be colored, the uniformity of the treatment can be promoted by maintaining the medium in movement, for example by means of agitators. Alternatively, the medium can be agitated by injecting gas into it.

During the diffusion of the reducible metallic ions into the body from a medium in a molten state, the required concentration of the reducible metallic ions can be maintained by electrolytic dissolution of a certain quantity of a solid or liquid substance providing the necessary ions.

Advantageously, the medium utilized for the second step of the treatment includes one or several zinc salts. It has been noted that the presence of one or several zinc salts in the treatment medium can aid the diffusion of given reducible metallic ions into the surface of a body of glass under given conditions. The addition of an appropriate zinc salt to a medium containing a copper salt permits the achievement of a darker tint and enables the attainment of tints extending to green or even to gray.

Advantageously, the medium utilized for the second step of the treatment contains at least one salt furnishing the reducible metallic ions and it is selected from the group consisting of nitrates, chlorides and sulfates. In general, these salts are easy to prepare, to manipulate and to utilize. In addition, these salts are in the molten state and do not decompose at the temperatures under consideration.

As a result of the enrichment of the surface layers of the glass body with a reducing agent during the first step of the process, it is possible to quite easily obtain useful color densities during the second step of the treatment, even when use is made of a treatment medium in which the compound or compounds furnishing the reducible metallic ions are silver compounds whose concentration in the medium is very small, for example markedly less than 3% by weight and even, in optimum cases, as small as 100 parts per million, by weight, as mentioned above. Based on the concentration of silver ions in the medium utilized in the second step of the treatment and/or the influence of other factors, such as the presence or absence of an adjuvant or, possibly, a zinc salt, it is possible to obtain colorations which satisfactorily assure a protection against actinic light, provided that the second step of the treatment has a duration of between 15 minutes and 120 hours and the treatment temperatures are between 400° and 540°C. When use is made of a treatment medium containing a compound of copper constituting between 40 and 60% by weight, of the medium, very good copper colorations can be obtained, provided that the second step of the process has a duration of 2 to 30 minutes and the treatment temperatures are between 550° and 600°C.

The above examples only illustrate possible treatment conditions for the second step of the process and it is certain that treatment times and treatment temperatures substantially different from those which have been mentioned above can be utilized if necessary.

The salt or salts constituting the diluting agent in a treatment medium utilized in the second step of the process can also perform another function supplementary to that of a diluent. For example, the diluting agent can include a metallic salt furnishing metallic ions which diffuse into the glass body, in exchange for other ions, in a manner to impart other modifications to its surface properties.

In certain processes according to the invention, the diluting agent includes metallic ions, preferably alkaline metal ions, which diffuse into the body in exchange for smaller ions, and such a diffusion takes place at a temperature such as to cause surface compressive stresses to tbe introduced into the glass body and to not be permitted to relax entirely during the treatment time. The body is thus chemically tempered and, as a result, presents an enhanced resistance to breakage due to traction, or tension, forces. During such a chemical tempering treatment, preferably potassium ions are caused to enter the glass in exchange for smaller sodium ions. Preferably, such ion exchange takes place at a temperature below the strain point of the glass.

In certain important embodiments of the invention, the diluting agent is composed entirely or in its major part of potassium nitrate and the remainder of the medium is composed entirely or in its major part of silver nitrate. Such a treatment medium has proven particularly effective for producing coloration and effecting a chemical tempering during the second step of the coloring process.

The process according to the invention can be employed not only for coloring initially colorless glass but also for modifying the color of a glass body which has already been given some coloration. When the process is applied to a previously colored glass body, it is carried out in exactly the same manner as for glass which is initially colorless. The modification of the coloration can result in a modification in the existing color, or tint, or can simply reinforce the existing color, or render the existing color, or tint, more intense, or darker. The existing color may have been produced by a previous treatment, which previous treatment could also have been carried out in accordance with the present invention.

Processes according to the invention can be carried out for imparting different colorations to different parts of the surface of a glass body. Thus, by way of example, a body of flat glass can be subjected to processes according to the invention to confer different colorations to the surface layers of the opposed faces of the glass. For example, both faces could be given yellow coloration, but the density of the coloration on one face could be different from that on the other face.

The invention also includes a glass body which has been formed and colored, or subjected to a color modification, by a process according to the invention.

In particular, the invention includes a vehicle windshield composed of two glass sheets, or at least one glass sheet and at least one plastic sheet, at least one glass sheet of the former or the glass sheet of the latter having been colored or subjected to a color modification on at least one of its faces by a process according to the invention. The two sheets of such a windshield are joined together along their edges or across their entire surface by an intervening layer of adhesive material, cement, and/or plastic. An epoxy resin can be utilized as the cement or adhesive material. Advantageously, the intervening layer includes a preformed sheet, which may be of polyvinylbutyral. Particular importance is attached to windshields composed of two such glass sheets, at least one of which has been colored or subjected to such color modification, these sheets being assembled together by means of a preformed intervening sheet, for example of polyvinylbutyral.

To provide a better appreciation of the nature and advantages of the present invention, several non-limitative examples thereof will be set forth below.

EXAMPLE 1

A glass ribbon having a thickness of 3mm is produced from a vitrifiable mixture according to the float glass technique.

The resulting glass has the following composition:

| | |
|---|---|
| 71% | $SiO_2$ |
| 1% | $Al_2O_3$ |
| 14% | $Na_2O$ |
| 9% | CaO |
| 4% | MgO | and small quantities of compounds such as $Fe_2O_3$, $SO_3$ and $K_2O$.

According to this well known fabrication technique, molten glass is delivered into a float tank containing molten tin in such a manner as to permit the glass to spread out on the surface of the tin bath to form a floating layer which moves across the tank.

During the movement of the glass in contact with the molten tin bath, $Sn^{++}$ reducing ions penetrate into the surface layers of the glass surface in contact with the molten metal.

The glass leaves the float tank in the form of a ribbon and is cooled to a solid state.

Glass sheets measuring 1m × 0.5m were cut from this ribbon, preheated, and then immersed in a bath of molten salts composed of $KNO_3$ and 0.0002% by weight, $AgNO_3$. The bath was maintained at a temperature of 470°C.

The sheets were withdrawn from the bath after having remained therein for 12 hours, and were then cooled.

It was observed that these sheets had attained a yellow coloration. It was also observed that it was the face which had been in contact with the molten tin bath which had the yellow coloration and that the other face, while it contained silver ions, did not appear colored to visual observation.

The tin concentration in the face of the glass which had been in contact with the molten metal bath was of the order of 1% by weight.

It is possible to impart a coloration to the glass sheet face which had not been in contact with the molten tin bath if account is taken of the fact that the presence above the tin bath of a gaseous atmosphere containing tin in the gaseous state and in a small concentration is nevertheless capable of causing a diffusion of $Sn^{++}$ reducing ions into the surface layers of the upper face of the glass ribbon.

The glass sheets which had been subjected to the treatment in the molten salt bath were not only colored, but also presented a high mechanical strength. Their resistance to breakage by flexure, expressed in terms of the maximum stress existing in that face of the sheet which was being tensionsed by the flexure force, was of the order of 100 kg/mm², while identical glass which had not been placed in contact with the molten salt bath had a comparable strength of the order of 7 kg/mm². The increase in the mechanical strength of the glass is associated with the substitution in its surface layers of potassium ions from the bath for sodium ions initially in the glass. This substitution occurred to the same degree in both faces of the glass, so that both faces had their surface layers symmetrically modified.

EXAMPLE 2

Glass sheets measuring 1m × 0.5m and having a thickness of 3mm and having the same composition and obtained by the same process as that of Example 1 were immersed during 8 hours in a bath maintained at a temperature of 470°C and composed of 92.5%, by weight, $KNO_3$ and 7.5%, by weight, KCL, to which had been added silver nitrate in a concentration of 0.001%, by weight.

The result was identical with that obtained in the process of Example 1, the glass having been given a yellow coloration on the face thereof which had been in contact with the molten tin bath, the sheets also having acquired on increased mechanical strength.

The same test was then repeated on other sheets of the glass, some sheets being immersed in the molten salt treatment bath for 120 hours with the bath temperature maintained at 400°C and other sheets being immersed in the treatment bath for 15 minutes at a temperature of 550°C.

The result obtained was the same, but it became apparent that it is necessary to not exceed the temperature of 550°C, except for very short times, or else the surface compressive stresses will have time to relax and after cooling the glass sheet faces will have lost their compressive stresses, in which case the strength of the resulting glass will not be greater than it was before treatment.

The same treatment was repeated on further sheets of the glass in a treatment bath at 470°C and for a treatment time of 8 hours, the bath containing the same quantity of $AgNO_3$ as set forth above, but the KCl and $KNO_3$ of the above-described bath was replaced by 40%, by weight, KCl and 60%, by weight, $ZnCl_2$.

The result obtained was the same as above except that the percentage of light absorption of the glass was higher, which demonstrates that the zinc salts exert a certain influence on the treatment process.

EXAMPLE 3

Glass sheets identical with those employed in the above Examples were immersed for 8 hours in a bath of molten salts at a temperature of 465°C and composed of $KNO_3$ to which had been added $Ag_2SO_4$ in a concentration of 1%, by weight.

The glass obtained after withdrawal from the molten salt bath had a yellow coloration on that face which had been in contact with the molten tin bath and presented a breakage resistance under flexure, expressed in terms of the maximum stress existing in the surface of the sheet which was placed in tension by the flexure, of the order of 100 kg/mm². The coloration was however deeper than in the preceding Examples, the coloration being yellow-amber.

The same test was carried out on additional glass sheets with the silver sulphate concentration raised to 8%, by weight. The result of this process was to give the glass a brown coloration.

EXAMPLE 4

A glass sheet having a composition of 80% $SiO_2$, 2% $Al_2O_3$, 13% $B_2O_3$, 3.5% $Na_2O$, 1% $K_2O$ and a very small quantity of $Fe_2O_3$ was floated across the surface of a molten tin bath at a temperature of 950°C. Subsequently, this glass was immersed in a bath of molten salts identical with that of Example 3, i.e. a bath composed of $KNO_3$ together with 1% by weight of $Ag_2SO_4$ and maintained at 465°C.

The resulting glass had been given a brownish coloration on the face which had been in contact with the molten tin.

EXAMPLE 5

Glass sheets identical with those utilized in Example 1 and formed by the float glass process were immersed for 12 hours in a bath maintained at a temperature of 470°C and composed of 92.5% by weight, $KNO_3$ and 7.5%, by weight, KCl to which bath had bee added CuCl in a concentration of 5%, by weight.

After withdrawal of the sheet from the bath and cooling, it was noted that that face of the glass which had been in contact with the molten tin bath had a pink color and that, on the other hand, the glass had acquired a high resistance to breakage due to flexure, the resistance corresponding to a maximum stress in that face of the glass sheet which was placed in tension by the flexure of the order of 100 kg/mm².

The same test was carried out on further glass sheets by replacing the diluting salt by 57% by weight, $K_2SO_4$ and 43%, by weight, of $ZnSO_4$ and it was noted that in this case the glass was given a green coloration, demonstrating that the presence of a zinc salt in the diluting medium can exert an influence on the treatment.

EXAMPLE 6

Glass sheets identical with those utilized in Example 1 and formed by the float glass process were immersed for 12 hours in a bath maintained at a temperature of 470°C and containing 0.001%, by weight, AuCl diluted in $KNO_3$.

After withdrawal of the glass sheets from the bath and cooling, it was noted that the glass sheet face which had been in contact with the molten tin bath had a red color and that, in addition, the glass had acquired a high resistance to breakage due to flexure, which resistance value corresponded to a maximum stress of that face of the sheet which was placed in tension by the flexure of the order of 100 kg/mm².

EXAMPLE 7

Glass sheets identical with those utilized in Example 1 and formed by the float glass process were immersed in a bath of molten salts having the following composition: 45%, by weight, $CuSO_4$; 20%, by weight, $Na_2SO_4$; and 35%, by weight, $K_2SO_4$.

The sheets were immersed in the bath for 10 minutes at a temperature of 580°C, and were then slowly cooled and rinsed with water.

That face of the sheets which had been in contact with the molten tin bath was observed to have a coloration in the range from yellow to orange.

It is also necessary to note that the presence of sodium ions in the bath inhibited the penetration of potassium ions in exchange for sodium ions initially present in the glass, this occurring symmetrically in the two opposed faces of the sheet, with the result that the compressive stresses induced in the glass sheet faces were very weak, and almost zero.

An identical test was performed on further glass sheets, with the exception that the 20% of $Na_2SO_4$ was replaced by 20% of $ZnSO_4$. The resulting coloration was gray, thus illustrating the influence of zinc ions on the treatment.

By varying the temperature conditions over a range of 500° – 600°C, and the duration of the treatment from several minutes to 24 hours, it is possible to obtain colorations extending from yellow, orange, pink and red to dark green and even gray.

In the presence of zinc salts, the coloration is always very deep. This is associated with the fact that the copper ions are subjected, during the course of the treatment, to various complex oxidation-reduction reaction mechanisms.

In certain cases, certain zones of the sheet were less colored than others. This defect is suppressed when, during the immersion, gas bubbles are injected into the molten salt medium.

EXAMPLE 8

Glass having a composition of 72.5% $SiO_2$, 1.5% $Al_2O_3$, 14% $Na_2O$, 7.5% CaO, 4% MgO and small quantities of $K_2O$, $Fe_2O_3$ and $SO_3$, while being fabricated in the form of a ribbon, is placed in contact, when its temperature is of the order of 800°C, i.e. in the drawing chamber, with a molten alloy of 50%, by weight, Sn and 50%, by weight, Sb.

During this passage in contact with the alloy, the tin and the antimony, in the form of ions, entered into the glass so as to cause the glass surface which had been in contact with the alloy to contain reducing ions.

A glass sheet cut from such a ribbon was immersed in a molten bath of $KNO_3$ containing 0.0002%, by weight, $AgNO_3$, maintained at a temperature of 465°C, the immersion lasting for 12 hours.

The result of this treatment was that the glass, after cooling, had a resistance to breakage due to flexure, expressed in terms of the maximum stress existing in that face which was subjected to tension by the flexure, of the order of 80 kg/mm² and presented a yellow coloration of the faces which had been placed in contact with the alloy.

Glass can be treated in the same manner with the Sn-Sb alloy replaced by, for example, such alloys as Se-Sn, As-Sn, Bi-Pb, and As-Fe, which are liquid at the temperatures at which the ribbon is formed, or by vapors of S or of Se, which permit the introduction of reducing ions into the glass surface.

It is also possible to proceed in a similar manner by contacting the glass with one of the alloys such as Ce-Sn, Cu-Sb, Mn-Sn, Pb-W, or by molten lead, and then by immersing it into a bath containing a gold salt to obtain a red coloration.

EXAMPLE 9

Sheets of soda lime glass having a composition comparable to that of Examples 1 or 8 were formed by floating a ribbon of glass obtained from a bath of molten glass on a bath of liquid tin.

An electric potential difference was produced between the metal, serving as anode, and an electrode placed in contact with the glass at the upstream end of the float glass tank and serving as a cathode. (Such a process may be performed in an apparatus as described e.g. in the French Pat. No. 1.368.838).

Measurement of the electric current flowing through this system permits a control and monitoring of the quantity of tin introduced into the surface layers of the glass in contact with the molten metal.

A direct current of the order of 100 amperes was delivered to the tin bath while the glass ribbon floated therealong. As a result, reducing ions were introduced into the glass.

Sheets of the glass as formed were then immersed in a mixture of molten salts composed of 90% $NaNO_3$ and 10% KCl, to which had been added 0.0002%, by weight, $AgNO_3$.

After 8 hours of immersion in this bath at a temperature of 400°C, the glass had acquired a deep yellow coloration at that face of the glass which had been in contact with the molten tin.

EXAMPLE 10

Glass sheets were formed by passing a ribbon of glass obtained from a bath of molten glass on a bath of molten tin.

The ribbon had a bronze coloration, i.e. it contained within its mass coloring elements such as iron and selenium.

These sheets were then immersed for 8 hours in a bath of $KNO_3$ maintained at 450°C. The molten salt contained in addition a small quantity of $AgNO_3$, in a concentration of about 0.004%, by weight.

After withdrawal of the sheets from the molten salt bath, and cooling, it was noted that the sheets had become dark brown, the resulting coloration producing slightly more light absorption than that which one would expect to obtain by adding together the initial coloration and the coloration due to the silver. In addition, the glass had an increased resistance to breakage due to flexure.

It will be understood that the above description of the present invention is susceptible to various modifications, changes and adaptations, and the same are intended to be comprehended within the meaning and range of equivalents of the appended claims.

We claim:

1. A process for imparting a desired coloration to a body of ordinary soda-lime-silica glass which is free of phosphorus pentoxide and formed from a vitrifiable composition, by diffusing a substance into surface layers of the body from a medium contacting the body, comprising the steps of:
   introducing a reducing agent into such surface layers by diffusion starting from the outer surface of the body, to cause such agent to be concentrated in such layers in an amount of at least 1% by weight;
   placing the body surface, after said step of introducing, into contact with such a medium composed of a mixture of (a) a salt furnishing reducible silver metal ions in an amount sufficient to impart coloration to the body, and capable of being reduced by the reducing agent and (b) a diluting agent constituted by a salt of another metal, furnishing metal ions which diffuse into the body in exchange for smaller ions initially present in the body, the total concentration in the medium of the salt furnishing reducible silver metal ions being less than one hundred parts per million; and
   during said step of placing, maintaining the surface layers at a temperature which causes such reducible silver metal ions to diffuse into the body surface layers and to be chemically reduced by the reducing agent and such ion exchange to induce in surface layers of the body compressive stresses which are prevented from relaxing entirely during the course of said step of placing, said diffusion of reducible silver metal ions and said ion exchange occurring similtaneously.

2. A process as defined in claim 1 wherein said step of introducing is carried out by causing the glass body to float on a mass of material having a higher density than the glass body, and constituting a source of the reducing agent, and causing the reducing agent to diffuse into the glass body from the mass of material.

3. A process as defined in claim 1 wherein the reducing agent is constituted by tin ions.

4. A process as defined in claim 3 wherein said step of introducing is carried out by bringing the body into contact with a mass of molten tin so as to permit tin ions to diffuse into the surface layers.

5. A process as defined in claim 1 wherein the reducing agent is constituted by the ions of at least one of the elements selected from the group consisting of Pb, Cu, As, Sb, Bi, S, Ce, Fe, Se, V, Cr, Mn, Mo and W.

6. The process according to claim 1 wherein the total concentration of the salt furnishing reducible silver metal ions is at least 2 ppm.

7. The process according to claim 1 wherein the total concentration of the salt furnishing reducible silver metal ions is 2 ppm.

8. A method as defined in claim 1 wherein the reducing agent includes tin ions and said step of introducing is carried out so as to cause the concentration of tin ions in the body surface layers to be at least 1% in at least one part of the body.

9. The process according to claim 1 wherein the total concentration of the salt furnishing reducible silver metal ions is 10 ppm.

10. A process as defined in claim 1 wherein the medium is constituted by salts in their molten state.

11. A process as defined in claim 10 wherein the salt of another metal constituting a diluting agent includes a zinc salt.

12. A process as defined in claim 1 wherein the salt furnishing reducible silver metal ions is a nitrate, a chloride, or a sulfate.

13. A process as defined in claim 1 wherein the diluting agent constitutes a source of potassium ions and the glass body initially contains sodium ions, the potassium ions diffusing into the body in exchange for such sodium ions during said step of placing.

14. A process as defined in claim 13 wherein at least the major portion of the diluting agent is constituted by potassium nitrate and at least the major portion of the salt furnishing reducible silver metal ions is constituted by silver nitrate.

15. A colored glass body produced by the process as defined in claim 1.

16. A vehicle windshield comprising two outer sheets and an inner sheet of plastic disposed between said outer sheets, at least one of said outer sheets being constituted by a glass body which has been given a desired coloration at at least one of its faces by the process as defined in claim 1.

17. A vehicle windshield as defined in claim 16 wherein both of said outer sheets are of glass and said inner sheet is a preformed intervening sheet of polyvinylbutyral joining said outer sheets together.

18. The process according to claim 1 wherein the temperature at which the surface layers are maintained during the step of placing is between 400° and 540°C.

* * * * *